Oct. 23, 1928.
J. H. SCHREIBER
COMPRESSOR
Filed April 10, 1926
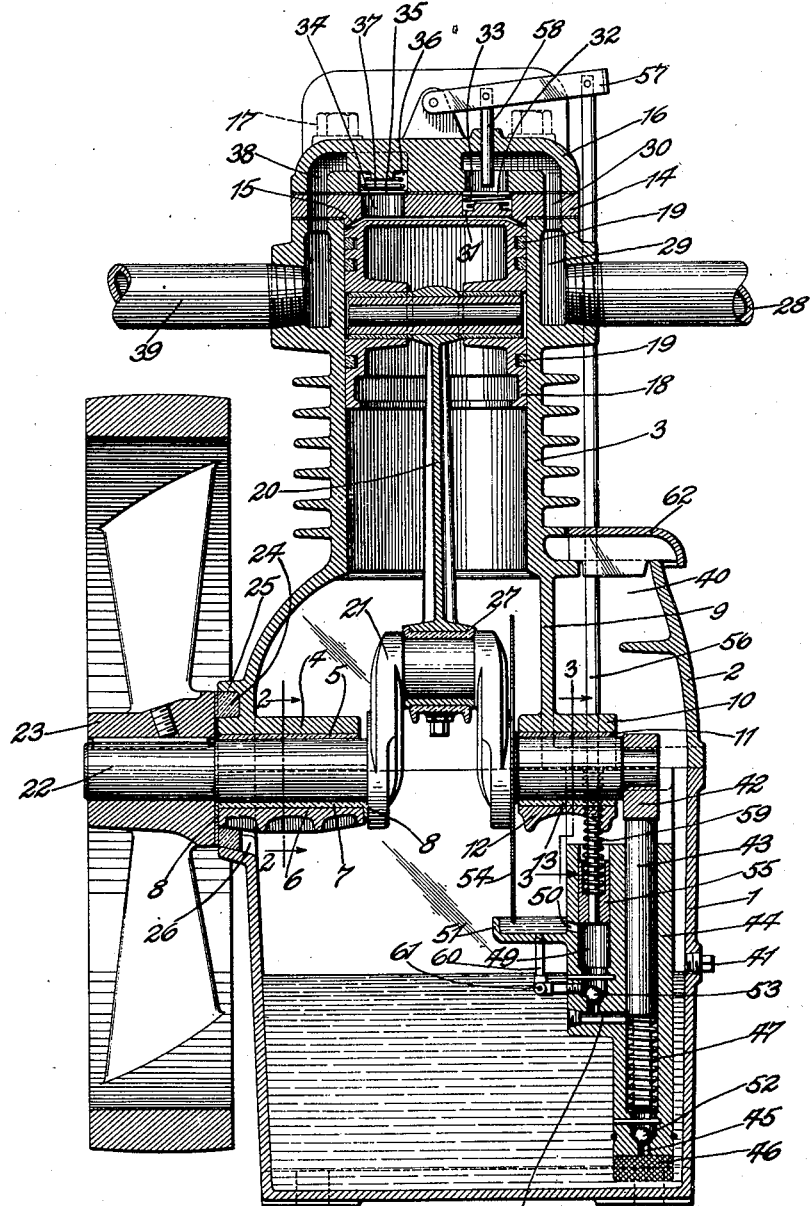
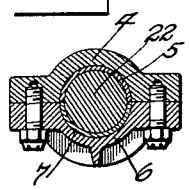
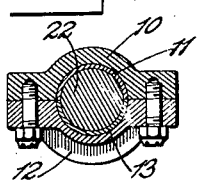
Inventor.
John H. Schreiber,
by Rippey & Amgeland
His Attorneys.

Patented Oct. 23, 1928.

1,688,990

UNITED STATES PATENT OFFICE.

JOHN H. SCHREIBER, OF ST. LOUIS, MISSOURI.

COMPRESSOR.

Application filed April 10, 1926. Serial No. 101,053.

This invention relates to compressors.

An object of the invention is to provide a compressor of simplified and efficient construction which may be economically manufactured and in which repairs and replacement of parts may be easily made, and in which many of the parts are of standard construction and available on the market in nearly every commercial or industrial locality.

Another object of the invention is to provide an improved compressor comprising lubricating means and connections operating automatically and as an incident to stopping of the compressor to relieve the pressure within the compression cylinder.

Another object of the invention is to provide a compressor embodying an oil pump for supplying lubricant for operating parts, an inlet valve to the compression cylinder, and connections controlled by the lubricating means for opening said valve to relieve pressure within the compression cylinder when operation of the compressor is stopped, and thus facilitate restarting of the compressor.

Another object of the invention is to provide an improved compressor designed, adapted and constructed to utilize parts and devices of standard manufacture, now practically universally available on the market, in the initial construction of the machine and which parts may be quickly removed and replaced for the purpose of making repairs, etc., due to the fact that such parts of standard manufacture are available as aforesaid.

Another object of the invention is to provide a compressor equipped with means for applying oil to the operating parts, and means for preventing effective operation of the machine, by preventing the machine from effecting compression automatically and as an incident to the depletion of oil below the amount required to keep the machine properly lubricated.

Various other objects and advantages of the invention will appear from the following description, reference being made to the accompanying drawing which shows in Fig. 1 a vertical sectional view of the compressor.

Fig. 2 is a cross sectional view on the line 2—2 of Fig. 1 illustrating the manner in which bearing parts of standard manufacture and general availability are used in the machine.

Fig. 3 is a similar sectional view on the line 3—3 of Fig. 1.

The lower part 1 of the casing constitutes an oil reservoir and rigidly supports the upper part 2 of the casing which is extended to provide a compression cylinder 3. One side of the casing part 2 is formed with an integral semi-tubular bearing boss 4 provided with a babbitted lining 5. This part of the bearing is completed by a semi-tubular bearing element 6 rigidly attached to the boss 4 and by a bearing element 7 secured within the part 6 and provided at each end with a radial flange 8 engaging the respective ends of said part 6 and functioning as abutments for the crank of the crank shaft and the driving pulley, respectively.

Within the casing part 2 an integrally depending web 9 supports a semi-tubular bearing boss 10 in alinement with the bearing boss 4 and provided with a babbitted lining 11. This part of the bearing is completed by a semi-tubular bearing element 12 rigidly attached to the boss 10 by a bearing element 13 secured within the part 12.

An end or cover plate 14 is seated upon the upper end of the cylinder 3 and is formed with an annular flange 15 fitting within the cylinder and having its inner wall beveled to intersection with the flat inner side of said plate. A cylinder head 16 is mounted upon the plate 14. The plate 14 and the head 16 are attached to the cylinder by bolts 17. The plate 14 and the head 16 are removable without disconnecting or disturbing the pipe connections of the machine.

The peripheral corner of the end of the piston 18 is beveled and the flange 15 is shaped in conformity with the end of the piston. The piston rings 19 mounted on the piston above and below the piston pin prevent the passage of air or gas between the piston and the cylinder wall and obtain efficient compression. The piston is connected by a connecting rod 20 with the crank 21 of the crank shaft 22 journaled in the bearings above described. The crank 21 bears against the flange 8 at the inner end of the sleeve element 7 and the driving pulley 23 bears against the flange at the outer end of said element. Compressible packing material 24 is compressed by the hub of the pulley 23 within a seat 25 in the casing part 2, against the outer end of the part 6, and into a space 26 between said part 6 and the adjacent portion of the casing part 1.

An important feature of this invention consists of the construction and arrangement of parts of the machine so that many other parts of standard manufacture and which are available on the market in nearly every commercial or industrial locality are used in the initial construction and, because of their availability on the market, greatly reduce the cost and inconvenience of making repairs and replacements. In the machine shown and described the bore of the cylinder 3 is of a diameter to accommodate the standard Ford engine piston 18 with its equipment of piston rings 19, connecting rod 20 with its complete bearing connection 27 with the crank shaft 22, and the bearing elements 6 and 12. The solution of the problem of initial construction of the machine to use these parts of standard Ford manufacture is of great advantage to the public, for that as is well known said parts are available on the market nearly everywhere so that repair replacements can be inexpensively and quickly made.

The inlet pipe 28 opens into a chamber 29 in connection with the cylinder 3 from which a passage 30 continues through the plate 14, and the head 16 opens through a valve chamber 31 in the plate 14 and into the cylinder 3. A plate valve 32 in the chamber 31 is actuated to its seat against the head 16 by a spring 33, but yields to the suction of the piston to admit gas or air into the cylinder when the machine is operating. An outlet passage 34 from the cylinder is formed through the plate 14 and controlled by a valve 35 located in a valve chamber 36 in the head 16, and actuated to closed position by a spring 37. The valve chamber 36 opens into an outlet passage 38 communicating with a pipe 39.

Oil is delivered into the casing of the machine through an opening 40. The casing is preferably provided with an overflow opening closed by a plug 41 which may be removed to regulate the height at which the oil may rise in the casing during the operation of filling, the plug being afterwards replaced. The crank shaft 22 has an eccentric 42 attached thereto operating against the end of the pump element 43 operative in a rigid pump chamber 44 having an inlet opening 45 through its lower end to admit oil to the pump and provided with a screen 46 to exclude dirt and other solids. The pump 43 is actuated upwardly by a spring 47 and downwardly by the eccentric 42. Upward movement of the pump draws oil into the chamber 44 from which the passage 48 opens into a chamber 49 having a communication 50 to an oil pan 51. Backflow of oil from the chamber 44 is prevented by a valve 52, and from the chamber 49 by a valve 53. A lubricant applicator, comprising a disc 54, is attached to the shaft 22 and extends into the oil in the pan 51. In operation the disc 54 takes oil from the pan 51 and, by centrifugal force, delivers the oil to the operating parts.

A piston 55 operates within the chamber 49 and is attached to the lower end of a rod 56 extending upwardly to the outside of the cylinder and having its upper end pivoted to a lever 57. The lever 57 is pivoted to the head 16 and supports a rod 58 extending through the head 16 and terminating above the valve 32. A spring 59 encircling the lower part of the rod 56 has its lower end pressing against the piston 55 and its upper end against a stationary abutment. When the machine is started the oil pumped into the chamber 49 raises the piston 55 from its lower position across the opening 50 to a position above said opening, because the oil must find outlet from said chamber 49. When the piston 55 is raised, as stated, the rod 56 and its connections raise the rod 58 from the valve 32, leaving said valve entirely under control of the spring 31 and the suction of the piston 18. On down stroke of the piston 18 the valve 32 is opened to admit air or gas to the cylinder. When the compressor stops the spring 59 forces the piston 55 down, causing the rod 58 to open the valve 32 and prevent the establishment of pressure within the cylinder 3 until the oil pump has raised the rod 58 from the valve 32, thus facilitating the starting of the machine. This is because there is sufficient clearance between the piston 55 and the wall of the chamber 49 to permit leakage of oil through said clearance so that the piston 55 can be pressed down when the oil pump is not working; and yet the piston 55 will be raised by the oil when the machine is operating.

A pipe 60 from the lower part of the chamber 49 opens into the pan 51 and forms a by-pass to permit the passage of oil from the pump to the pan 51, without raising the piston 55 so that it is possible, under predetermined conditions, for the machine to operate without effecting compression. The pipe 60 is equipped with a valve 61 which may be opened in any desired manner to permit the passage of oil through the pipe 60 when sufficient compression in the compression tank is obtained, or at any other desired time. The valve 61 is kept closed during effective operation of the machine and is only opened when it is desired to relieve the machine from load and permit the machine to idle. When the valve 61 is opened the oil from the pump passes through the pipe 60 instead of through the opening 50, permitting the spring 59 to lower the rod 56 and cause the rod 58 to hold the valve 32 open, with the result that no compression is effected by the further operation of the machine until the valve 61 is closed.

When the oil in the casing becomes depleted below the amount required for sufficient lubrication the piston 55 will, of course, not be raised; and when no oil is flowing to the pan 51 the rod 58 is held down to hold the valve 32 open, preventing load in the compressor and permitting the compressor to run idly. The user of the machine is thus informed that the machine is running without effecting compression and can only restore the machine to effective operation by placing the proper amount of lubricant in the casing constituting the oil container. During effective operation of the machine the pan 51 is kept filled with oil.

The opening 40 is provided with a closure 62 slidable loosely on the rod 56 and pivoted eccentrically thereto, so that by raising said closure and turning it laterally it is removed from the opening 40 to permit oil to be poured into the casing.

The foregoing description of the machine structure includes a description of its operation. It is apparent that the structure of the machine may be modified in various particulars without departure from the nature and principle of the invention. I do not limit myself unessentially, but what I claim and desire to secure by Letters Patent is:—

1. A compressor comprising a cylinder having an inlet passage and an outlet passage, a piston operative within the cylinder, a shaft arranged to operate said piston, a lubricant pump operated by said shaft, and a part on said shaft arranged to deliver to said piston oil passing from said pump.

2. A compressor comprising a cylinder having an inlet passage and an outlet passage, a piston operative within the cylinder, a shaft arranged to operate said piston, a lubricant pump operated by said shaft, a part on said shaft arranged to deliver to said piston oil passing from said pump, a valve controlling said inlet passage, and means controlled by the oil from said pump permitting said valve to open and close when said piston operates.

3. A compressor comprising a cylinder having an inlet passage and an outlet passage, a piston operative within the cylinder, a shaft arranged to operate said piston, a lubricant pump operated by said shaft, a part on said shaft arranged to deliver to said piston oil passing from said pump, a valve controlling said inlet passage, and means controlled by the oil from said pump permitting said valve to open and close when said piston operates and arranged to open said valve when the piston stops.

4. A compressor comprising a cylinder having an inlet passage and an outlet passage, a valve controlling the inlet passage, a piston in the cylinder, a shaft arranged to operate the piston, a device for opening said valve when the piston stops, and mechanism operated by the shaft for lubricating the compressor and causing said devices to permit said valve to open and close when the piston operates.

5. A compressor comprising a compression cylinder having an inlet passage for air or gas to be compressed and an outlet passage for the compressed air or gas, a piston in the cylinder, a valve arranged to open and close the inlet passage when the piston operates, mechanism for operating the piston, a device for opening said valve when the piston stops, and mechanism for applying lubricant to the cylinder and the piston when the compressor is operating and also causing the lubricant to move said device to position to permit said valve to open and to close.

6. A compressor comprising a compression cylinder having an inlet passage for air or gas to be compressed and an outlet passage for the compressed air or gas, a piston in the cylinder, a valve arranged to open and close the inlet passage when the piston operates, a device for applying lubricant to parts of the compressor, an oil pump for pumping oil to said device, a shaft for operating said piston, said device and said oil pump, connections for opening said valve when the compressor stops, and means operated by the oil passing from said pump to said device for moving said connections to position to permit said valve to open and to close when the piston is in operation.

7. A compressor comprising a compression cylinder having an inlet passage for air or gas to be compressed and an outlet passage for the compressed air or gas, a piston in the cylinder, a valve arranged to open and close the inlet passage when the piston operates, a device for applying lubricant to parts of the compressor, an oil pump for pumping oil to said device, a shaft for operating said piston, said device and said oil pump, connections for opening said valve when the piston stops, an actuator for actuating said connections to open said valve as aforesaid, and means for causing the oil passing from said pump to said device to move said connections in opposition to said actuator to position to permit said valve to open and to close when the machine is in operation.

8. A compressor comprising a compression chamber having an inlet passage for air or gas to be compressed and an outlet passage for the compressed air or gas, mechanism for obtaining compression in said chamber, a valve arranged to open and close the inlet passage when the piston operates, a device operated by said mechanism for applying lubricant to said mechanism, a pump operated by said mechanism for delivering oil to said device, connections for opening said valve automatically and as an incident to the stopping of said mechanism, and means for causing the oil passing from said pump to said device to move said connections to position to permit said inlet passage to be opened and closed when said mechanism is operated.

9. A compressor comprising a compression chamber having an inlet passage and an outlet passage, mechanism for obtaining compression in said chamber, devices for delivering lubricant to said mechanism, means for operating said devices by said mechanism, means controlled by said devices permitting said inlet passage to be opened and closed when said mechanism operates, and an actuator for operating said means to open said inlet passage when said mechanism stops.

10. A compressor comprising compression mechanism, a casing in which a part of said mechanism is mounted, an oil pump in said casing operated by said mechanism, a lubricant applicator arranged to receive oil from said pump and to deliver oil to said mechanism, and means controlled by the oil passing from said pump to said applicator controlling the admission of air or gas to said compression mechanism.

11. A compressor comprising a casing, a compression cylinder, a piston operated in the compression cylinder, a crank shaft in said casing arranged to operate said piston, a device for delivering oil to said cylinder and piston, an oil pump operated by said shaft for delivering oil to said device, and means controlled by oil passing from said pump to said device controlling the admission of air or gas to said cylinder for compression.

12. A compressor comprising a cylinder having an inlet for air or gas to be compressed and an outlet passage for the compressed air or gas, a valve in the inlet passage, a device holding said valve open when the compressor is idle, and mechanism for lubricating the machine and also operating said device to position to permit said valve to open and to close when the compressor is running.

13. A compressor comprising mechanism for effecting compression of air or gas, means for operating said mechanism, devices for controlling admission of air or gas to said mechanism for compression and from said mechanism after compression, a device for delivering oil to said mechanism, and means for preventing said mechanism from effecting compression when an insufficient amount of oil is being delivered to said mechanism by said oil delivering device during continuous operation of said mechanism.

14. A compressor comprising mechanism for effecting compression of air or gas, devices for controlling admission of air or gas to said mechanism for compression and from said mechanism after compression, means for operating said mechanism, a device for delivering oil to said mechanism, and means controlled by the oil passing to said mechanism from said last named device controlling said device for admitting air or gas to said mechanism to prevent effective operation of the compressor while said mechanism is in continuous operation.

15. A compressor comprising mechanism for effecting compression of air or gas, devices for controlling admission of air or gas to said mechanism for compression and from said mechanism after compression, means for operating said mechanism, a device for delivering oil to said mechanism, means controlled by the oil passing to said mechanism from said last named device controlling said device for admitting air or gas to said mechanism to prevent effective operation of the compressor while said mechanism is in continuous operation, and a device for preventing control of said second named means by the oil passing to said mechanism.

16. A compressor having a cylinder having an inlet passage and an outlet passage, a piston operative within the cylinder, a shaft arranged to operate said piston, a lubricant pump operated by said shaft, mechanism controlled by oil passing from said lubricant pump controlling said inlet passage, and a device operated by said shaft to deliver to said piston oil passing from said pump.

17. A compressor comprising a cylinder, a piston operative within the cylinder, a shaft arranged to operate said piston, a device operated by said shaft for delivering oil to said piston, and a lubricant pump operated by said shaft to deliver oil to said device.

18. A compressor comprising a cylinder, a piston operative within the cylinder, a shaft arranged to operate said piston, an oil pump operated by said shaft, a receptacle arranged to receive oil from said pump, and a device operated by said shaft for delivering oil from said receptacle to said piston.

19. A compressor comprising a cylinder having an inlet passage and an outlet passage, a piston operative within the cylinder, a shaft arranged to operate said piston, a device for opening the inlet passage, a lubricant pump operated by said shaft, means for operating said device by oil passing from the lubricant pump to permit said inlet to be opened and closed by operation of the piston, and means for applying to the piston oil passing from said pump.

20. A compressor comprising a cylinder, a piston operative within the cylinder, a shaft for operating the piston, a lubricant pump operated in part by said shaft, a receptacle arranged to receive oil passing from said pump, a device for delivering oil from said receptacle to said cylinder and piston, an element arranged to be actuated by the oil passing from said pump to said receptacle, and means under control of said element for opening said inlet passage under predetermined conditions.

21. A compressor comprising a casing, a compression cylinder, a piston in the compression cylinder, a crank shaft, a connecting rod from the crank shaft to the piston for operating said piston by said shaft, a device other than said connecting rod operated by said crank shaft for delivering oil to said cylinder and piston, and an oil pump operated by said shaft for delivering oil to said device.

22. The combination of a compressor, unloading means for said compressor, a splasher for lubricating the compressor, and means for conducting lubricant to said splasher and also causing the lubricant to overcome said unloading means.

23. In combination, a compressor, a body of lubricating oil, a splasher for applying lubricant to said compressor, an unloading device for said compressor, and means for forcing said lubricating oil to said splasher and causing said means to overcome said unloading device.

24. In combination, a compressor, a body of lubricating oil, an unloading device normally active to unload the compressor, a piston operable to render said unloading means inactive, a device for applying lubricating oil to the compressor, means for operating said last-named device, and a pump driven by the compressor delivering oil to said piston and also to said last-named device.

25. In combination, a compressor, a body of lubricating oil, an applicator for delivering oil to the compressor, means for operating said applicator, unloading means for said compressor, a device for disabling said unloading means and also feeding oil to said applicator, and means for permitting said unloading means to function without interfering with the lubrication of the compressor by said applicator.

JOHN H. SCHREIBER.